(12) United States Patent
Jiang et al.

(10) Patent No.: US 8,322,560 B2
(45) Date of Patent: Dec. 4, 2012

(54) DEVICE HOUSING

(75) Inventors: Xiao-Jiang Jiang, Shenzhen (CN);
Shuo-Hsiu Chang, Taipei Hsien (TW);
Wei Deng, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 455 days.

(21) Appl. No.: 12/577,906

(22) Filed: Oct. 13, 2009

(65) Prior Publication Data

US 2011/0049139 A1 Mar. 3, 2011

(51) Int. Cl.
*B65D 6/00* (2006.01)
*B65D 6/28* (2006.01)
*B65D 8/04* (2006.01)
*B65D 8/18* (2006.01)

(52) U.S. Cl. ...... 220/677; 220/4.01; 220/4.02; 220/682; 455/575.1; 455/575.8

(58) Field of Classification Search ............... 220/4.01, 220/4.02, 677, 682; 455/575.1, 575.8; 361/679.3; 52/204.5
See application file for complete search history.

(56) References Cited

U.S. PATENT DOCUMENTS

| | | | | |
|---|---|---|---|---|
| 3,504,710 | A * | 4/1970 | Pancoast | 138/170 |
| 7,089,571 | B2 * | 8/2006 | Volk et al. | 720/630 |
| 7,933,123 | B2 * | 4/2011 | Wang et al. | 361/679.56 |
| 8,023,260 | B2 * | 9/2011 | Filson et al. | 361/679.55 |
| 2008/0104904 | A1 * | 5/2008 | Walch | 52/204.5 |
| 2008/0218371 | A1 * | 9/2008 | Joo | 340/815.65 |
| 2009/0059502 | A1 * | 3/2009 | Filson et al. | 361/681 |

\* cited by examiner

*Primary Examiner* — Anthony Stashick
*Assistant Examiner* — Madison L Poos
(74) *Attorney, Agent, or Firm* — Altis Law Group, Inc.

(57) ABSTRACT

A device housing includes a glass plate and a plastic frame. The glass plate is received in the plastic frame. The glass plate forms a positioning surface in an edge. The plastic frame and the glass plate are integrally formed, thus the plastic frame connects the glass plate with no gap, and the plastic frame forms a connecting portion combined with the positioning surface.

12 Claims, 8 Drawing Sheets

DEVICE HOUSING

CROSS-REFERENCE TO RELATED APPLICATIONS

This application is related to four co-pending U.S. patent applications, application Ser. No. 12/577,902 and application Ser. No. 12/577,917, and both entitled "DEVICE HOUSING," application Ser. No. 12/577,912, and entitled "FASTENER AND DEVICE HOUSING USING THE SAME," application Ser. No. 12/577,924, and entitled "METHOD FOR MANUFACTURING DEVICE HOUSING." The co-pending applications have the same assignee as the present application.

BACKGROUND

1. Technical Field

The present disclosure relates generally to device housings and, more particularly, to a device housing for an electronic device.

2. Description of Related Art

With developments in technology, electronic devices such as mobile phones are not only required to perform many functions, but also provide an appearance appealing to the user.

Figure 7:
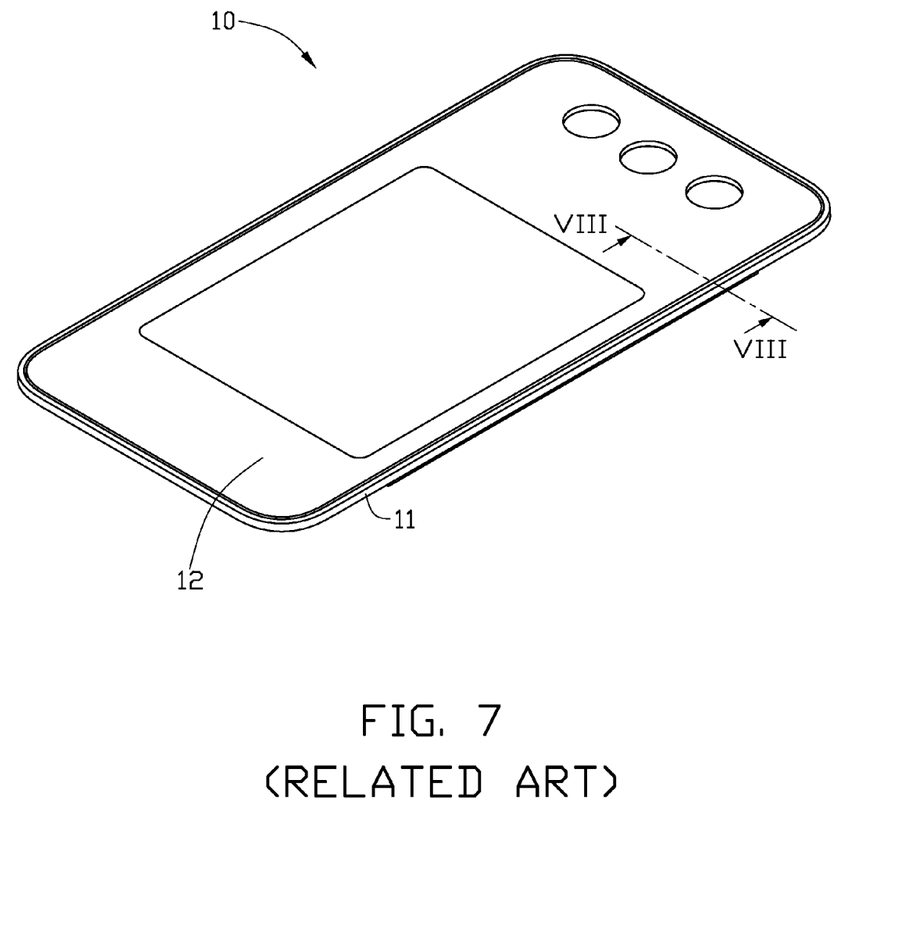
FIG. 7 is an isometric view of a commonly used device housing.
Figure 8:
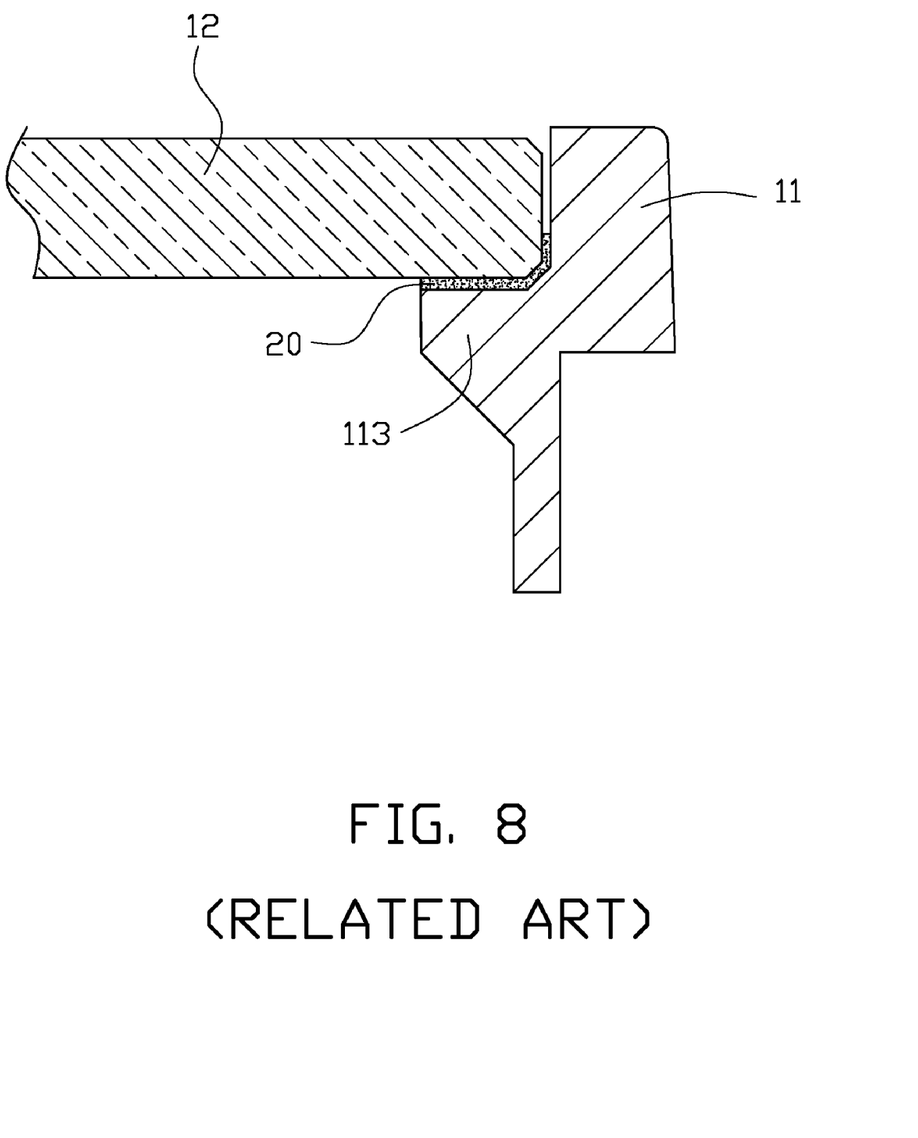
FIG. 8 is a cross-section of the device housing of FIG. 7 taken along line VIII-VIII.

Referring to FIGS. 7 and 8, a frequently used device housing 10 for a mobile phone includes a frame 11 and a glass plate 12 received therein. The frame 11 is substantially rectangular, and forms a positioning portion 113 on an inner surface. During assembly of the device housing 10, the adhesive 20 is coated on the positioning portion 113. The glass plate 12 is received in the frame 11, and attached to the positioning portion 113. Thus, the glass plate 12 and the frame 11 are glued together. The adhesive 20 is generally epoxy resin glue, which can only be used once.

However, a gap may form between the glass plate 12 and the frame 11, out of which the adhesive 20 may overflow, affecting appearance. Furthermore, the adhesive 20 may not uniformly cover the positioning portion 113, such that a top surface of the glass plate 12 may misalign with a top surface of the frame 11. The appearance of the device housing 10 is again affected.

Therefore, a device housing overcomes the described limitations has a good appearance is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
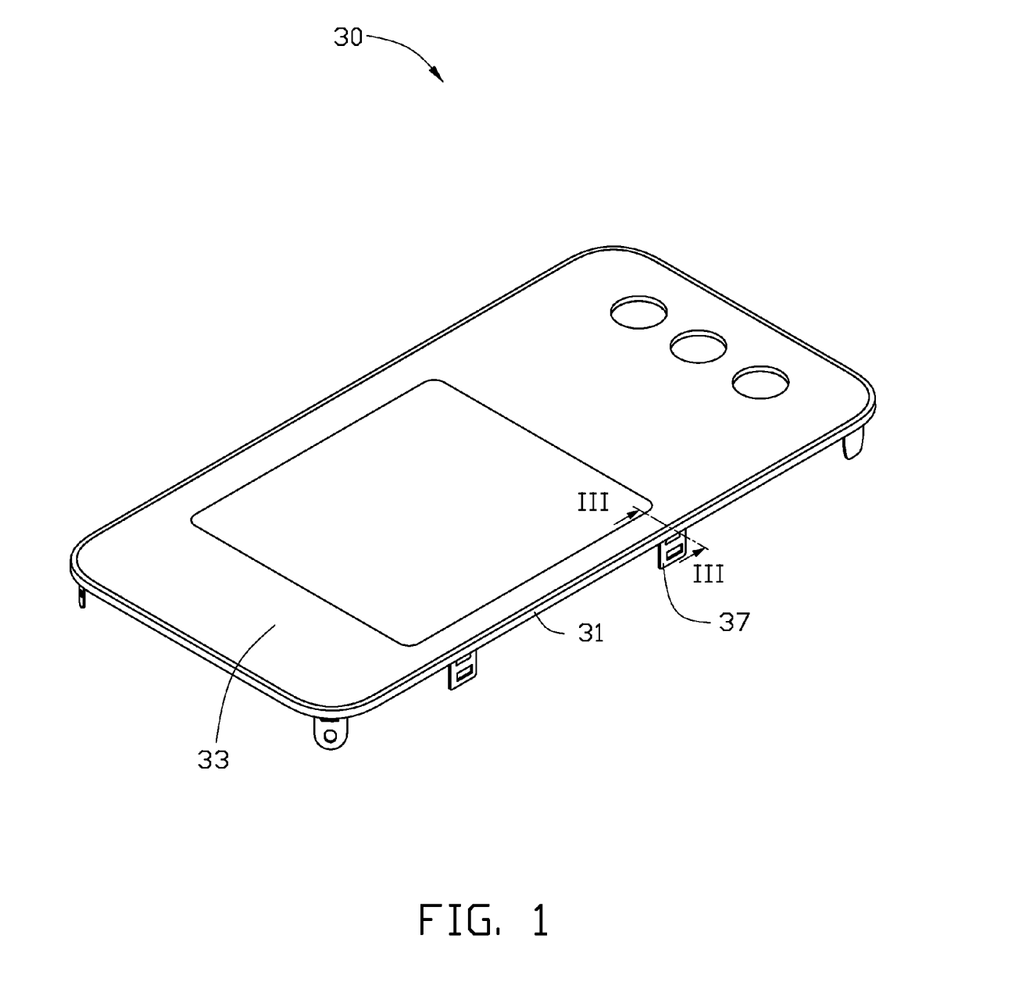
FIG. 1 is an isometric view of a first embodiment of a device housing.
Figure 2:
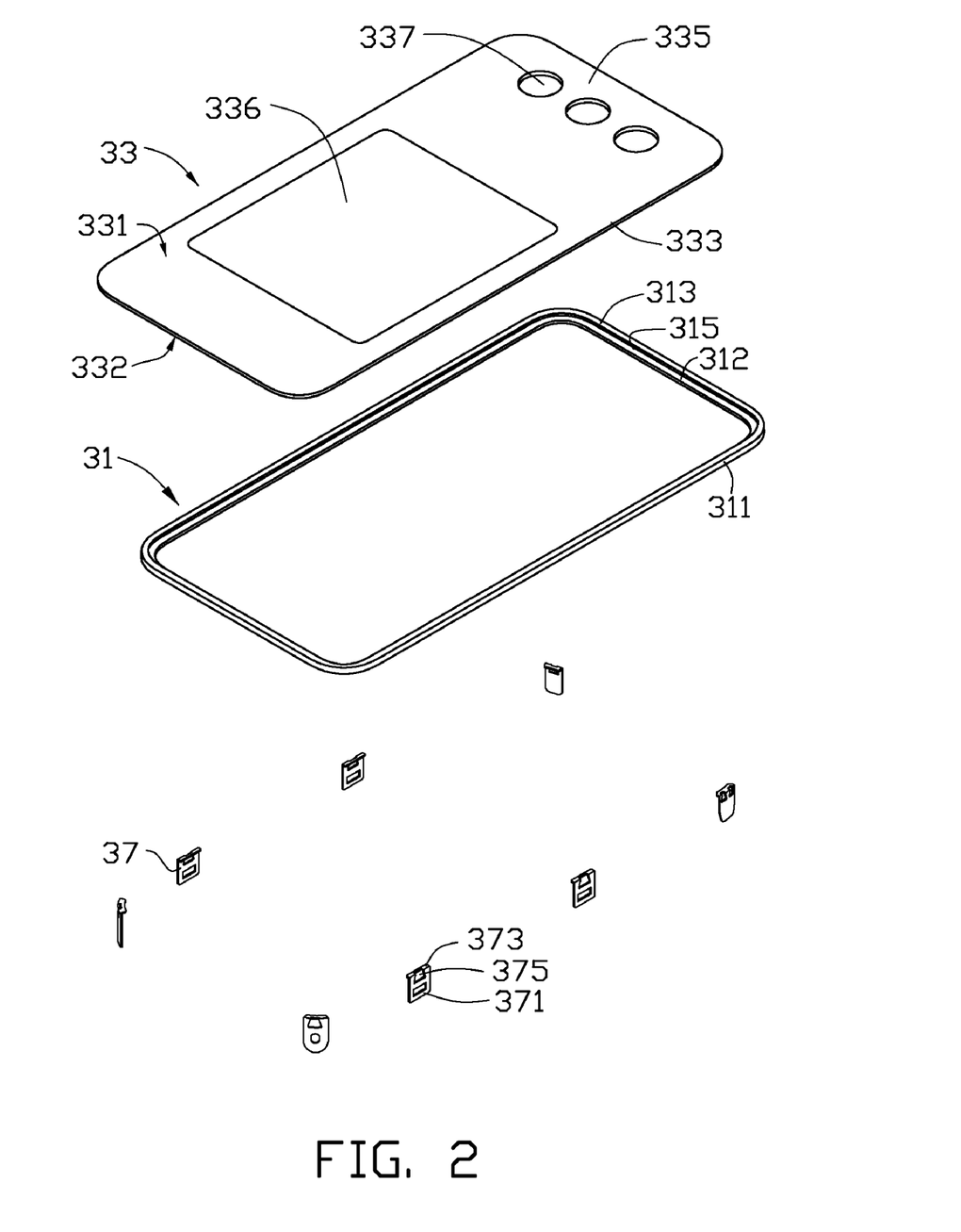
FIG. 2 is an exploded, isometric view of the device housing of FIG. 1.
Figure 3:
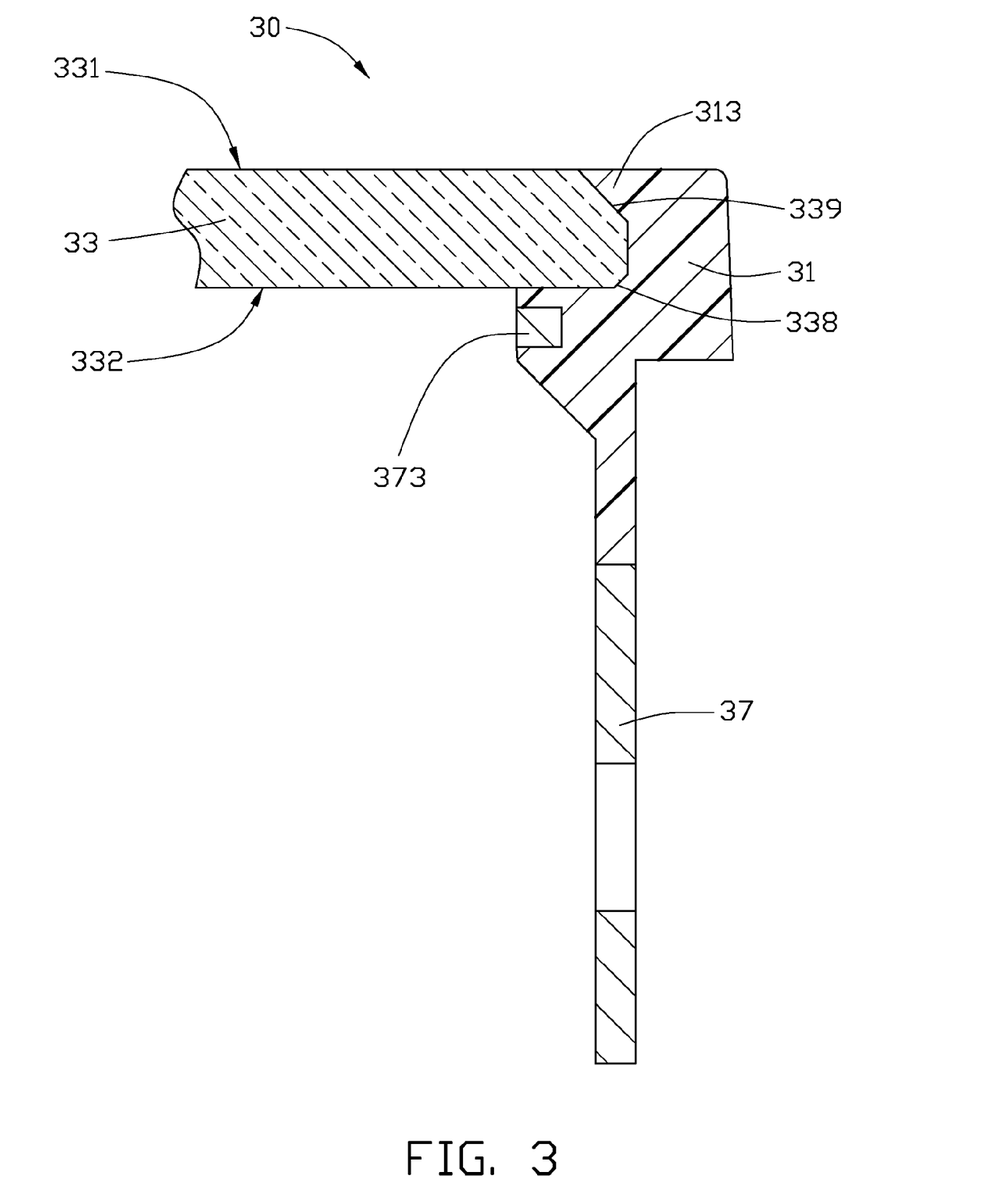
FIG. 3 is a cross-section of the device housing of FIG. 1 taken along line III-III.

Referring to FIGS. 1 through 3, a first embodiment of a device housing 30 is integrally formed by a plastic frame 31, a glass plate 33, and a plurality of metal members 37. In the illustrated embodiment, the device housing 30 is used with an electronic device (not shown).

The plastic frame 31 includes a side frame 311, an annular positioning portion 312, and an annular connecting portion 313. The positioning portion 312 is formed on a middle part of an inner surface of the side frame 311. The connecting portion 313 is formed on a top part of the inner surface of the side frame 311. The positioning portion 312, the connecting portion 313, and the side frame 311 cooperatively defines a receiving groove 315. The plastic frame 31 is formed by injection molding (not shown). In the illustrated embodiment, the side frame 311 is substantially rectangular. The plastic frame 31 is comprised of nylon and fiberglass.

The glass plate 33 includes a first surface 331, a second surface 332 opposite to the first surface 331, and a side surface 333 between the first surface 331 and the second surface 332. The glass plate 33 forms a positioning surface 339 in an edge, connecting the first surface 331 and the side surface 333. A periphery of the first surface 331 is coated with printing ink to form a light shielding portion 335 and a light guiding portion 336 surrounded by the light shielding portion 335. An end of the glass plate 33 defines three assembling holes 337 arranged side by side. A chamfer angle 338 is formed on an edge of the second surface 332, enhancing structural integrity of the glass plate 33. In the illustrated embodiment, the glass plate 33 is substantially rectangular.

Each metal member 37 includes a main body 371 and a hook portion 373 extending from an end of the main body 371. Each metal member 375 defines one or more connecting holes 375 allowing molten plastic material therethrough during injection. The connecting holes 375 are filled with plastic material after the molten plastic material cools. In the illustrated embodiment, the metal member 37 is stainless steel.

The device housing 30 can be integrally formed by molding as follows: positioning the glass plate 33 and the metal members 37 in the injection mold, the metal members 37 corresponding to the edge of the glass plate 33; injecting molten plastic material to the side surface 333 of the glass plate 33 and the metal members 37 to form the plastic frame 31, the plastic frame 31 having a connecting portion combining with the positioning surface 339 of the glass plate 33; and forming the receiving groove 315 to firmly receive the edge of the glass plate 33.

Since the plastic frame 31 and the glass plate 33 are integrally formed via the injection mold, no gap is formed therebetween, and a top surface of the glass plate 33 can be aligned with a top surface of the plastic frame 31. Thus, the device housing 30 presents an unspoiled appearance. In addition, the device housing 30 is integrally formed, thus manufacturing efficiency is enhanced.

It should be pointed out that the plastic frame 31 and the glass plate 33 may be other shapes, for example, the glass plate 33 can be an ellipse, and the plastic frame 31 an ellipsular ring.

Figure 4:
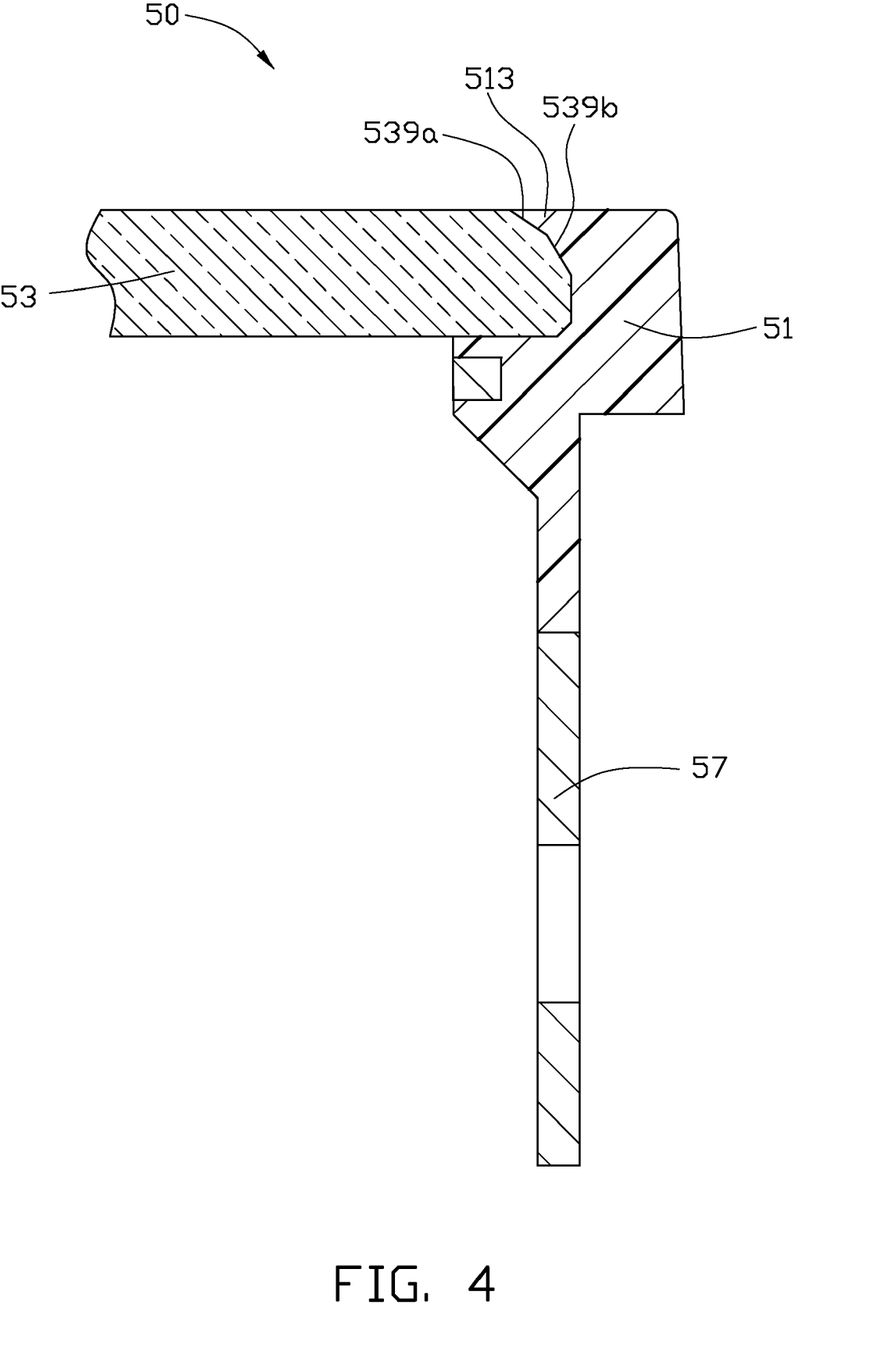
FIG. 4 is an isometric view of a second embodiment of a device housing.

Referring to FIG. 4, a second embodiment of a device housing 50 is integrally formed by a plastic frame 51, a glass plate 53, and a plurality of metal members 57. The device housing 50 differs from the device housing 30 of the first embodiment only in that the glass plate 53 forms a first positioning surface 539a and a second positioning surface 539b obliquely connecting with the first positioning surface 539a on the edge thereof. The plastic frame 51 has a connecting portion 513 combining with the first positioning surface 539a and the second positioning surface 539b. The first positioning surface 539a and the second positioning surface 539b make combination strength between the plastic frame 51 and the glass plate 53 of the device housing 50 stronger than that of the device housing 30.

Figure 5:
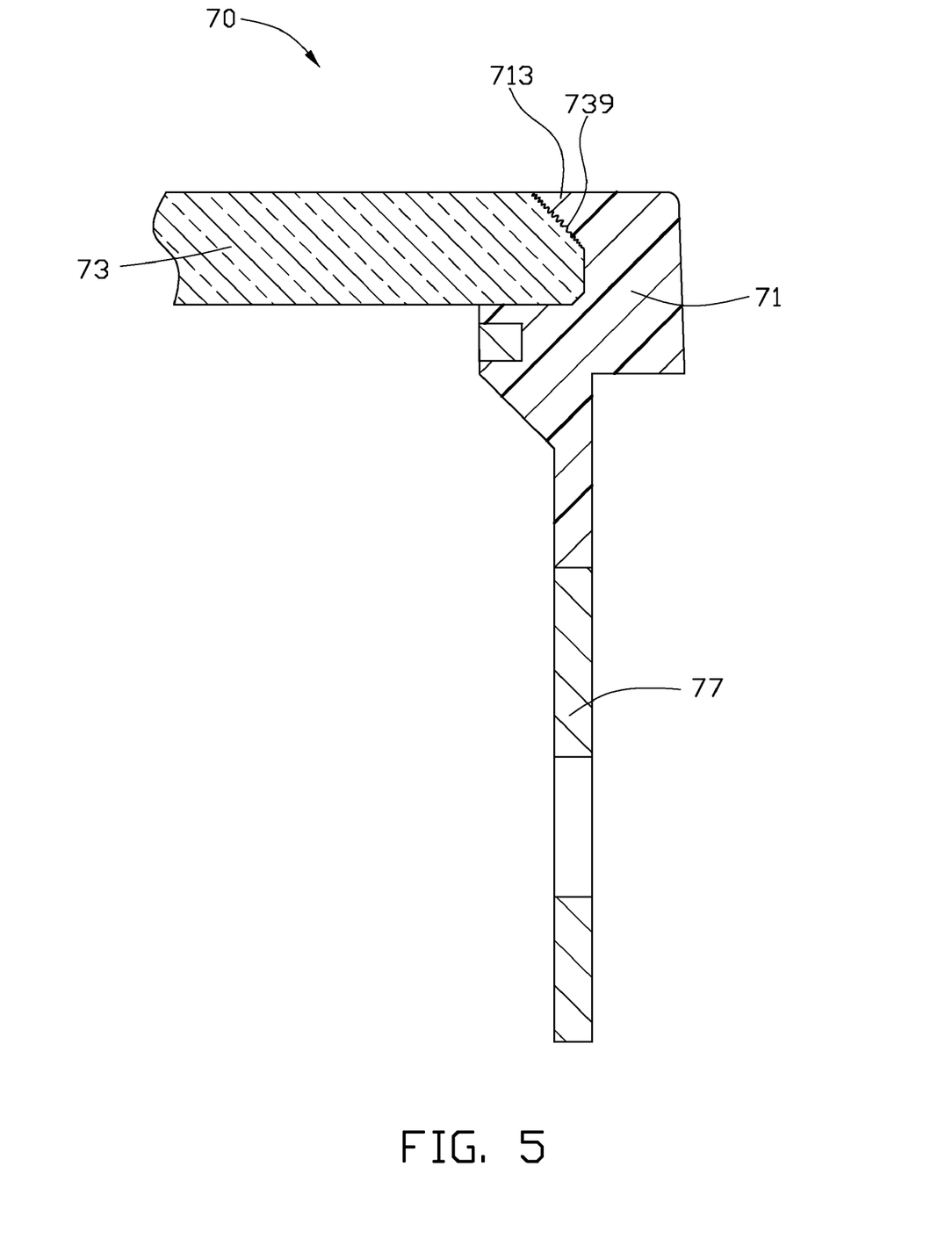
FIG. 5 is an isometric view of a third embodiment of a device housing.

Referring to FIG. 5, a third embodiment of a device housing 70 is integrally formed by a plastic frame 71, a glass plate 73, and a plurality of metal members 77. The device housing 70 differs from the device housing 30 of the first embodiment only in that a positioning surface 739 of the glass plate 73 is roughened, and a connecting portion 713 of the plastic frame 71 combines with the positioning surface 739 of the glass plate 73. The combined strength of the plastic frame 71 and the glass plate 73 of the device housing 70 is stronger than that of the device housing 30 because the positioning surface 739 is roughened.

Figure 6:
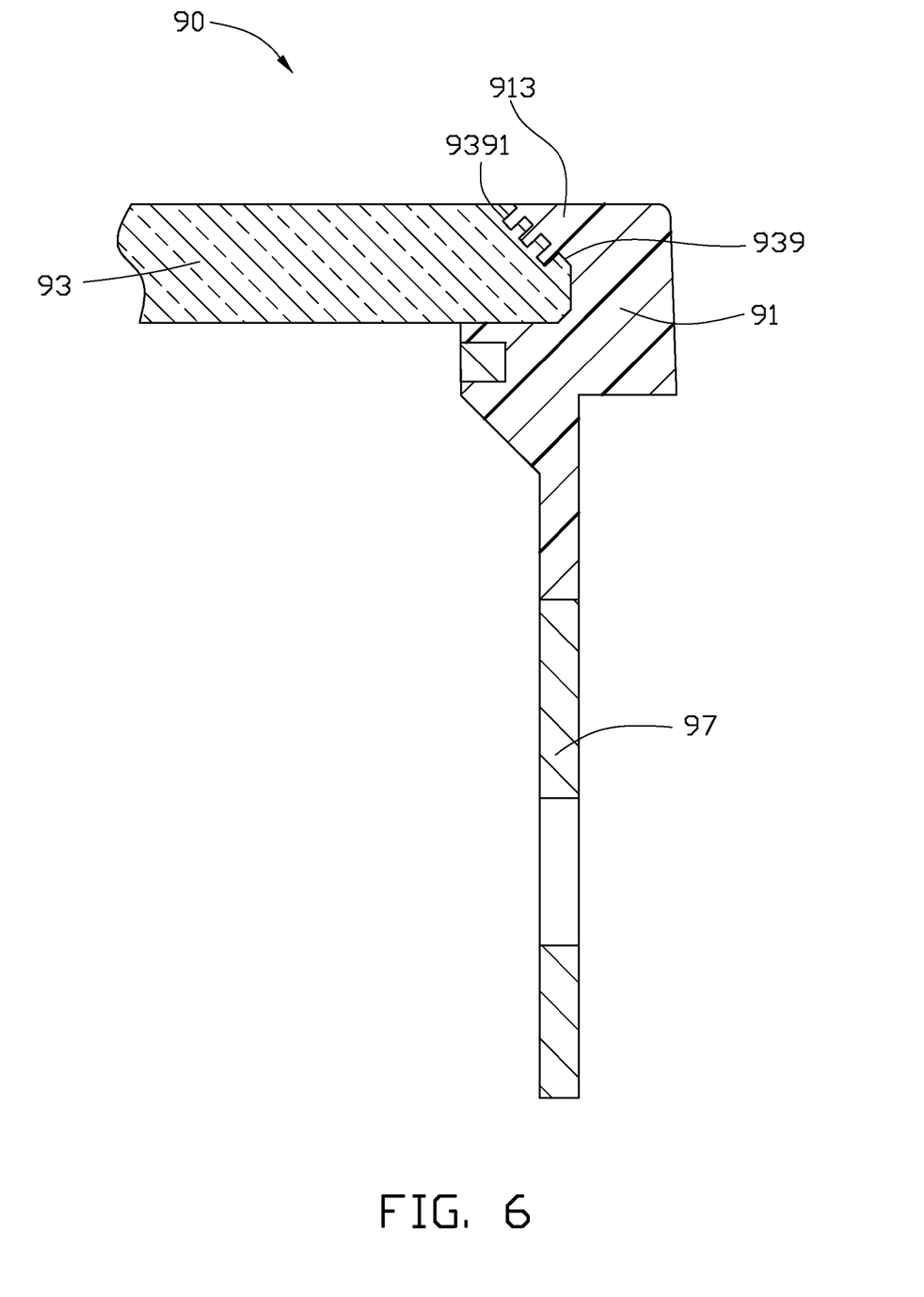
FIG. 6 is an isometric view of a fourth embodiment of a device housing.

Referring to FIG. 6, a fourth embodiment of a device housing 90 is integrally formed by a plastic frame 91, a glass plate 93, and a plurality of metal members 97. The device housing 70 differs from the device housing 30 of the first embodiment only in that a positioning surface 939 of the glass plate 93 defines a plurality of connecting holes 9391 engaged by a connecting portion 913 of the plastic frame 91. The combined strength of the plastic frame 91 and the glass plate 93 of the device housing 90 is stronger than that of the device housing 30.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A device housing, comprising:
   a glass plate; and
   a plastic frame for receiving the glass plate, the glass plate forming at least one positioning surface in an edge, wherein the glass plate comprises a first surface, a second surface opposite to the first surface, and a side surface between the first surface and the second surface, the at least one positioning surface being defined at the edge of the first surface and connects the side surface; wherein the plastic frame and the glass plate are integrally formed, the plastic frame forms a connecting portion combined with the at least one positioning surface, and the at least one positioning surface comprises a first positioning surface and a second positioning surface obliquely connecting with the first positioning surface.

2. The device housing of claim 1, wherein at least one of the first positioning surface and the second positioning surface is roughened.

3. The device housing of claim 1, wherein at least one of the first positioning surface and the second positioning surface defines a plurality of connecting holes engaging with the connecting portion.

4. The device housing of claim 1, wherein the plastic frame comprises a side frame on an inner surface of which the connecting portion is formed.

5. The device housing of claim 4, wherein the side frame forms a positioning portion on the inner surface, and the positioning portion, the side frame, and the connecting portion cooperatively define a receiving groove to receive the glass plate.

6. The device housing of claim 1, wherein a chamber chamfer angle is formed at the edge of the glass plate, and connects the second surface with the side surface.

7. The device housing of claim 1, wherein a periphery of the first surface is coated with printing ink to form a light shielding portion and a light guiding portion surrounded by the light shielding portion.

8. The device housing of claim 1, wherein the plastic frame comprises nylon and fiberglass.

9. The device housing of claim 1, further comprising a plurality of metal members integrally formed with the plastic frame.

10. The device housing of claim 9, wherein each metal member comprises a main body and a hook portion extending from an end of the main body, the hook portion engaging with the plastic frame.

11. The device housing of claim 9, wherein each metal member defines at least one connecting hole for partly receiving the plastic frame.

12. The device housing of claim 9, wherein the metal member is stainless steel.

* * * * *

UNITED STATES PATENT AND TRADEMARK OFFICE
CERTIFICATE OF CORRECTION

PATENT NO. : 8,322,560 B2  
APPLICATION NO. : 12/577906  
DATED : December 4, 2012  
INVENTOR(S) : Xiao-Jiang Jiang, Shuo-Hsiu Chang and Wei Deng Page 1 of 1

It is certified that error appears in the above-identified patent and that said Letters Patent is hereby corrected as shown below:

Title Page, below Item (65) insert:

-- (30)    Foreign Application Priority Data

Sep. 3, 2009    (CN) .....................2009 1 0306539 --

Signed and Sealed this
Twenty-fourth Day of December, 2013

Margaret A. Focarino
*Commissioner for Patents of the United States Patent and Trademark Office*